March 31, 1964 L. BRADT 3,126,838
TOW TRUCK SYSTEM
Filed June 6, 1962 2 Sheets-Sheet 1
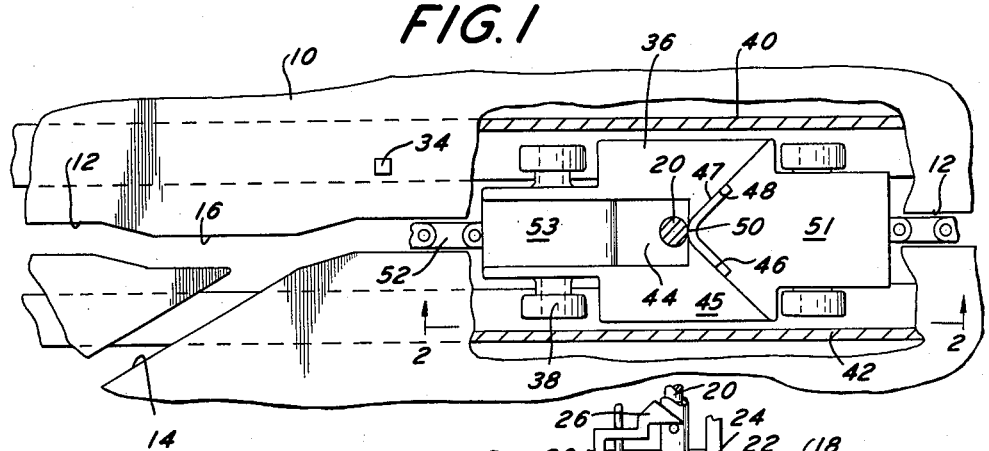
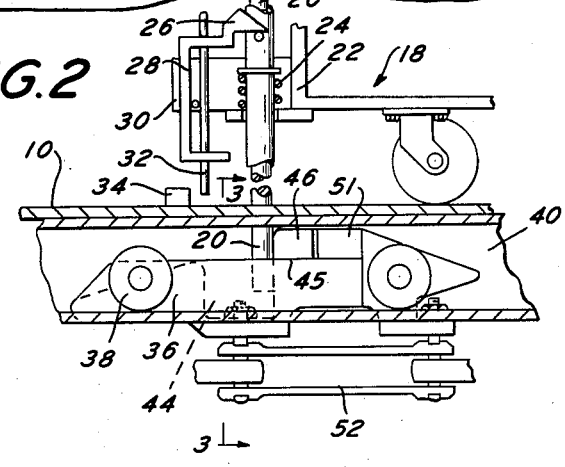
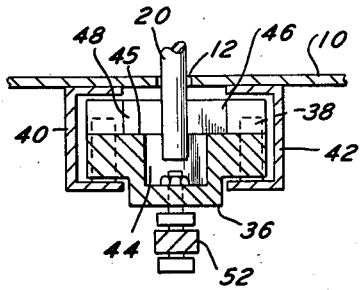
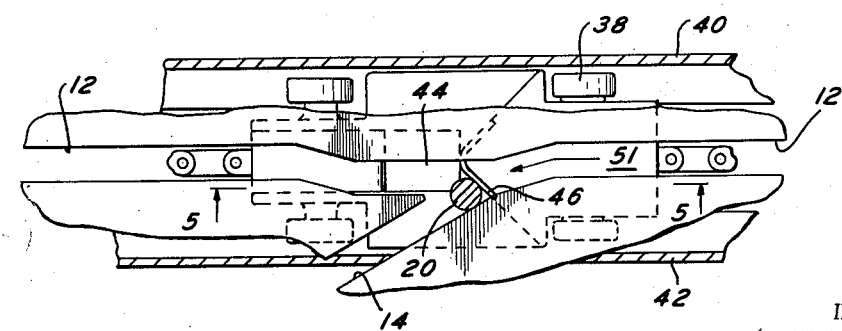
INVENTOR.
LYNN BRADT
BY
Arthur H Seidel
ATTORNEY March 31, 1964  L. BRADT  3,126,838
TOW TRUCK SYSTEM
Filed June 6, 1962  2 Sheets-Sheet 2
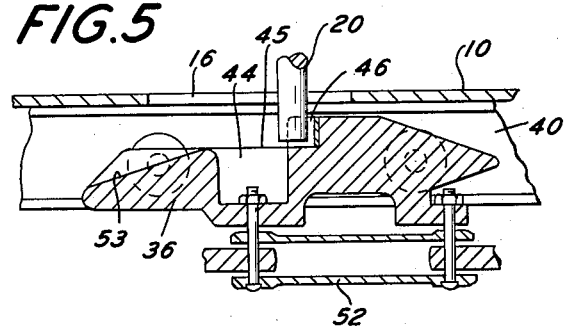
FIG.5
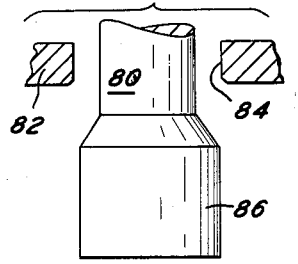
FIG.11
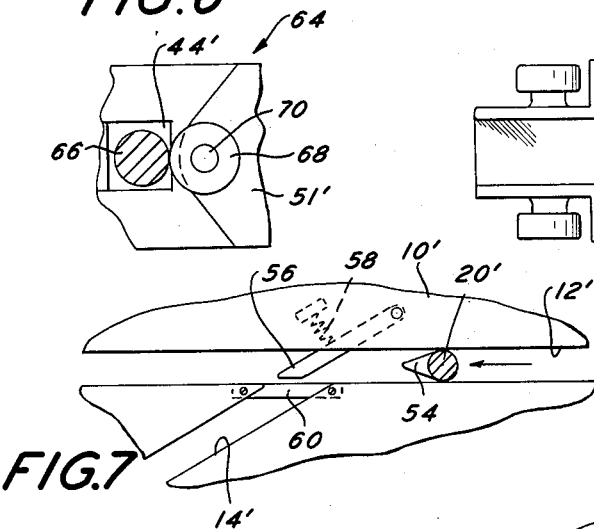
FIG.6
FIG.10
FIG.7
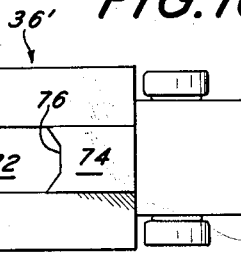
FIG.8
FIG.9
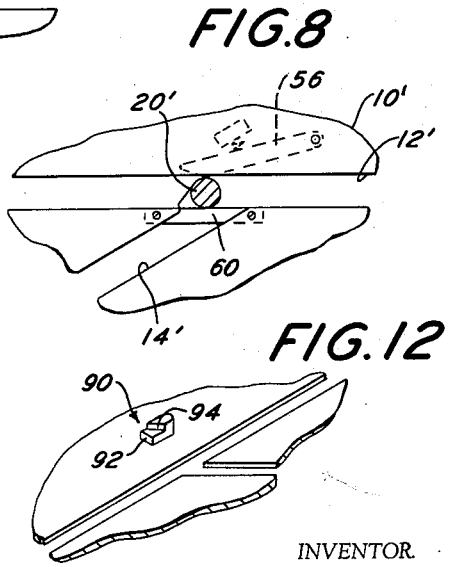
FIG.12
INVENTOR.
LYNN BRADT
BY Arthur H Seidel
ATTORNEY

United States Patent Office 3,126,838
Patented Mar. 31, 1964

3,126,838
TOW TRUCK SYSTEM
Lynn Bradt, Easton, Pa., assignor to SI Handling Systems, Inc., Phillipsburg, Pa., a corporation of Pennsylvania
Filed June 6, 1962, Ser. No. 200,408
19 Claims. (Cl. 104—88)

The present invention relates to a tow truck system, and more particularly, to a tow truck system wherein tow trucks or other vehicles may be shunted from a main slot along a shunt slot without requiring the provision of a switch plate at the intersection of the main slot and the shunt slot.

The present invention relates to a tow truck system wherein a tow truck or other vehicle having a single tow pin is propelled by a dog or the like on a drag chain. Heretofore, it was always considered necessary to have a switch plate at the intersection of a main slot and shunt slot. For example, see FIGURE 18 of my prior Patent No. 2,936,718. The switch plate performs the function of preventing the tow truck from being shunted into the various shunt slots except for a predetermined single shunt slot. In accordance with the present invention, this function is accomplished by means other than a switch plate.

In accordance with the preferred embodiment of the present invention, the main slot is provided with an offset portion in the area where the shunt slot intersects the main slot. The dog on the drag chain is provided with specifically contoured surfaces which cooperate with the tow pin in a manner so that the dog prevents the tow pin from entering all but one of the shunt slots as determined by the particular disposition of a trip rod member or the like. When the vehicle approaches the intersection of the main slot and the designated shunt slot, the dog assists in directing the tow pin into the shunt slot.

In another embodiment of the present invention, the entry of the shunt slot is at a higher level than the lowermost point on a trip rod under normal operating conditions. Unless the trip rod is raised vertically, it may not enter the shunt slot. If the trip rod is raised vertically, means are provided to assist in directing the tow pin into the shunt slot.

Switch plates are not completely reliable and have been found to be subject to a substantial amount of wear. The substantial amount of wear to which the switch plates have been subjected in the past requires their frequent replacement, maintenance attention, and tends to effect the reliability of the system. The present invention enables the tow truck system of the present invention to accomplish the same desirable features and objects of the systems proposed heretofore, enables a tow truck having a single tow pin to be switched either to the right or to the left, provides a more positive system, and eliminates the necessity for a switch plate and the undesirable features associated therewith.

It is an object of the present invention to provide a novel tow truck system.

It is another object of the present invention to provide a positive tow truck system which eliminates the necessity for switch plates at the juncture of a main and shunt slot.

It is another object of the present invention to provide a tow truck system wherein a conveyor dog restrains switching of a tow truck along a shunt slot.

It is another object of the present invention to provide a tow truck system wherein offset portions are provided in a main slot in the area of a juncture between the main slot and a shunt slot.

It is another object of the present invention to provide a novel tow truck system wherein a tow truck having a single tow pin may be shunted either to the left or to the right of a main slot without utilizing switch deflector plates at the switch off points.

It is still another object of the present invention to provide a novel conveyor system for a tow truck system.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a partial top plan view of a conveyor system of the present invention.

FIGURE 2 is a sectional view taken along the line 2—2 in FIGURE 1.

FIGURE 3 is a sectional view taken along the line 3—3 in FIGURE 2.

FIGURE 4 is a partial plan view of the system illustrated in FIGURE 1, with the moving elements at a subsequent stage.

FIGURE 5 is a sectional view taken along the line 5—5 in FIGURE 4.

FIGURE 6 is a top plan view of a dog in accordance with another embodiment of the present invention.

FIGURE 7 is a partial top plan view of a conveyor system in accordance with another embodiment of the present invention.

FIGURE 8 is a view similar to FIGURE 7 but illustrating the elements at a subsequent stage.

FIGURE 9 is a partial perspective view of the system illustrated in FIGURE 7.

FIGURE 10 is a partial top plan view of conveyor dog in accordance with another embodiment of the present invention.

FIGURE 11 is a partial sectional view illustrating the relationship between a tow pin in accordance with another embodiment of the present invention and the main slot.

FIGURE 12 is a perspective view of an abutment.

Referring to the drawing in detail, wherein like numerals indicate like elements, there is shown in FIGURE 1 a partial top plan view of a conveyor system in accordance with the present invention wherein the floor is designated as 10.

The floor 10 is provided with a main slot 12 which is intersected at spaced points therealong by shunt slots extending to either or both sides of the main slot 12. For example, the main slot 12 in FIGURE 1 is intersected by a shunt slot 14 in an offset portion 16 of the main slot 12.

As shown more clearly in FIGURE 2, a tow truck designated generally as 18 is adapted to be propelled along the main slot 12 and diverted into one of the shunt slots intersecting therewith. The tow truck 18 is provided with an upright reciprocally supported tow pin 20 disposed forwardly of a front wall 22. The lowermost end of the tow pin 20 extends through the main slot 12 as will be made clear hereinafter. A selectively operable means is provided to raise the tow pin 20 a specified distance when it is desired to cause the truck 18 to be shunted along one of the shunt slots.

The last mentioned means may include a spring bias on the tow pin or utilize a cam structurally interrelated with the tow pin as illustrated and described more clearly in my copending application Serial No. 169,270, filed on January 29, 1962, and entitled Tow Truck System. The disclosure in my copending application is incorporated herewith. For purposes of illustration, the present invention will be described hereinafter as having a spring biased tow pin.

A sleeve surrounding the tow pin 20 is biased upwardly in a direction away from the floor 10 by means of a spring 24. The spring 24 is maintained in a compressed condition by engagement between a lug on the tow pin sleeve and hook 26. Hook 26 is integral with a C-shaped member 28. Member 28 is rotatably supported at its ends by a pair of brackets 30 (only one is shown) extending forwardly from the front wall 22 of the truck 18. Member 28 is adapted to rotate about an axis on and extending transversely across the front of the truck 18.

As illustrated more clearly in my above mentioned copending application, the member 28 has a plurality of aligned holes at spaced points therealong. A trip rod 32 is adapted to extend through a pair of the aligned holes. The disposition of the trip rod 32 along the member 28 determines whether or not it will contact abutment 34 thereby rotating member 28 and hook 26 in a counter clockwise direction in FIGURE 2. Upon such rotation, the spring 24 will expand thereby raising the tow pin 20 and its sleeve upwardly for a specified distance which will become clear hereinafter in connection with the discussion of the conveyor dog 36.

Conveyor dogs 36 are secured to a drag chain 52 at spaced points therealong. For purposes of the present invention, it is not deemed necessary to illustrate more than one dog on the chain 52. The dog 36 is provided with a plurality of wheels 38 which roll along a track disposed beneath the floor 10. The track for the dogs 36 follows the main slot 12 and does not have an offset portion corresponding to portion 16. The track is comprised of C-shaped plates 40 and 42 whose inwardly directed flanges provide a supporting surface for the wheels 38.

The inwardly directed flanges on the plates 40 and 42 are spaced from one another thereby defining a slot through which the connecting elements between the dog 36 and chain 52 extend. The dog 36 is provided with a well or pocket 44 in which the lowermost end of the tow pin 20 extends when the spring 24 is compressed. Hence, it will be noted that the lowermost end of the tow pin 20 in FIGURES 2 and 3 is below the surface 45 on the dog 36. The width of pocket 44 is at least equal to the width of slot 12 plus twice the amount of off-set of portion 16 with respect to slot 12.

The dog 36 is provided with a boss 51 extending upwardly from the surface 45 and to the rear of pocket 44. The rear surface of pocket 44 may be a flat face as illustrated or may be an angled face. Boss 51 is provided with diverging surfaces adjacent the pocket 44. A removable insert 47 made from a hard material is provided at the apex 50 of the diverging surfaces on the boss 51. The insert 47 is provided with camming surfaces 46 and 48 on opposite sides of the apex 50.

The operation of the tow truck system illustrated in FIGURES 1–5 is as follows:

At a central loading or unloading position, the trip rod 32 will be disposed in a preselected disposition along the member 28. Thereafter, the truck 18 will be moved to a disposition so that the tow pin 20 extends through the main slot 12 which may be in floor 10 or in a channel member on floor 10 and the spring 24 is compressed. As pointed out in my copending application, the tow pin 20 is disposed within a sleeve so that it may freely rotate and move in an upward direction since the spring 24 acts on a sleeve surrounding the tow pin 20 and the hook 26 opposes such spring bias.

As the dog 36 is pulled along its track by the chain 52, the lowermost end of the tow pin 20 contacts the inclined surface 53 thereby causing the tow pin 20 to be raised upwardly. As soon as the pocket 44 is below the tow pin 20, the tow pin 20 falls thereinto. Since the diameter of the tow pin 20 is substantially equal to the distance across the main slot 12, the tow pin 20 will be in contact with the portion of the insert 47 adjacent the apex 50 on the boss 51. Thereafter, the dog 36 will propel the truck 18 along the main slot 12.

It will be assumed that the trip rod 32 has been positioned so that it will contact abutment 34 thereby causing the truck 18 to be shunted along slot 14. It will be noted that abutment 34 is located in a position just prior to the offset portion 16. When trip rod 32 contacts abutment 34, it rotates the member 28 and hook 26 in a counter clockwise direction in FIGURE 2. Such rotation enables the spring 24 to expand thereby causing the tow pin 20 and its sleeve to move upwardly. The tow pin 20 is permitted to move upwardly from the position illustrated in FIGURE 2 to the position illustrated in FIGURE 5. Hence, it will be seen that the tow pin assumes the position illustrated in FIGURE 5 at approximately the same time that it enters the offset portion 16 of the main slot 12.

When the tow pin 20 enters the offset portion 16, the wheels on the truck 18 are caused to swivel in the direction of the entrance to the offset portion. Hence, it will be seen that the tow truck 18 is headed or directed toward the slot 14. The dog 36 rides on a track which continues along a straight line. Hence, the tow pin 20 no longer contacts the apex of the boss 51, but rather is now in camming engagement with surface 46 which assists in causing the tow pin 20 to enter the slot 14.

If shunt slot 14 were not the predetermined shunt slot along which it was desired to direct the tow truck 18, trip rod 32 would not contact abutment 34. Hence, the tow pin 20 would remain in its lowermost position as illustrated in FIGURES 2 and 3. As the truck 18 approaches the offset portion 16, the tow pin 20 would be restrained from entering the shunt slot 14 by the dog 36. It will be noted that the longitudinal axis of portion 16 is offset from the longitudinal axis of the main slot 12 by a distance corresponding to approximately one-half the width of the main slot 12. Hence, the slight excursion of the truck 18 occasioned by the portion 16 does not cause undue wear on the tow pin 20 when the tow truck 18 by-passes the shunt slot 14.

Hence, it will be seen that the truck 18 may be caused to enter any one of a plurality of shunt slots extending to the left or to the right of a main slot without utilizing a switch plate at the intersection of the main and shunt slots. In this manner, a more positive system having parts which are less subject to wear may be provided. In order to cushion the contact between the tow pin 20 and the wear insert 47 on the dog 36, the boss 51 may be made in two parts with a shock absorber device therebetween. In place of the inclined surface 53 on the dog 36, a conventional one-way pawl may be utilized.

In FIGURE 6, there is disclosed a partial top plan view of a conveyor dog designated generally as 64. The dog 64 is identical with the dog 36 except as will be pointed out hereinafter. Dog 64 is provided with a pocket 44' which is adapted to receive the lowermost end of a tow pin 66. Tow pin 66 may be identical with tow pin 20.

A roller bushing 68 is mounted for rotation about an upright pin 70 supported by the boss 51'. The roller 68 is disposed at the apex of the boss 51' and projects slightly therebeyond so that it contacts the tow pin 66 when the same is disposed within the pocket 44'. The provision of a roller 68 facilitates movement of the tow pin 66 to the left or to the right when a truck is to be shunted along a shunt slot. The provision of a roller 68 reduces the amount of wear on the dog 64 due to contact with the tow pin 66 since the tow pin 66 will not contact the dog at the same spot every time. Hence, rotation of roller 68 facilitates the provision of a different tow pin contacting surface for each tow pin. The roller 68 is preferably removable so that the same may be replaced when it shows signs of wear.

In FIGURES 7–9, there is disclosed another embodiment of the present invention wherein a tow truck may be caused to be directed along a shunt slot without utilizing a switch plate at the juncture of the shunt and main slot.

The floor 10' is provided with a main slot 12'. The main slot 12' does not have an offset portion corresponding to portion 16. The main slot 12' is intersected at spaced points therealong by shunt slots entering from the right and the left. For example, shunt slot 14' intersects the main slot 12'. The tow pin 20' is provided with a tapered or pointed toe 54 at its lowermost end.

A lever arm 56 extends transversely across the main slot 12' in line with the shunt slot 14'. One end of the lever arm 56 is rotatably supported in any convenient manner. The other end of the lever arm 56 is biased into engagement with a bridge 60 by spring 58. Bridge 60 extends across the entrance to the shunt slot 14' and is removably supported by the floor 10'. Lever arm 56 and bridge 60 are disposed in a plane which is below the plane of the uppermost surface of lever arm 56 and is also below the plane of the lowermost end of the tow pin 20' when the tow pin 20' has been actuated or raised in the manner described above when it is intended to divert the truck along the shunt slot 14'.

If the tow pin 20' is to be directed along the shunt slot 14', it will be assumed that it has been raised in the manner described above. When the toe 54 contacts the lever arm 56, contact therebetween causes the tow pin 20' to rotate in a counter clockwise direction in FIGURE 8 so that the point of the toe 54 extends in the direction of slot 14'. Such contact also imparts a thrust on the tow pin 20' thereby causing the tow pin 20' to enter the shunt slot 14'. The toe 54 and the tapered or pointed nature thereof facilitates the easy entrance of the tow pin 20' into the shunt slot 14'.

If the tow pin 20' is not permitted to be raised upwardly in response to actuation by a trip rod as described above, the lowermost end of the tow pin 20' and the toe 54 will be below the plane of the uppermost surface of bridge 60. Hence, the tow pin 20' will not be capable of entering the shunt slot 14' and will continue along the main slot 12' under the propelling effect of the dog structurally interrelated therewith. The tow pin 20' may be utilized with dog 36, dog 64 or with dog 36' illustrated in FIGURE 10.

Dog 36' is substantially identical with dog 36 except as will be made clear hereinafter. Dog 36' is provided with a planar surface 72 and a planar surface 74 which are at different levels. A tow pin engaging surface 76 extends between the surface 72 and the surface 74. Surface 72 is lower than surface 74. Hence, the tow pin is adapted to be in contact with surface 76 and propelled by the dog 36'. When a tow pin is actuated so that it is raised upwardly, it will clear surface 74 and will be directed into a shunt slot as the tow pin abuts off-set portion 16 by the momentum of the truck.

In FIGURE 11, there is disclosed another embodiment of a tow pin designated as 80 which may be utilized with the conveyor system illustrated in FIGURES 1–5. A floor 82 having a main slot 84 comparable to floor 10 and slot 12 are provided. The tow pin 80 is provided with an enlarged diameter portion 86 at its lowermost end.

The tow pin 80 will extend through the main slot 84 in the manner illustrated in FIGURE 11 when the tow pin is being propelled by a dog such as dog 36. In this position, the distance between the outer periphery of the tow pin 80 and the surfaces defining the slot 84 is sufficient to preclude undue wear on the tow pin when the tow pin is passing through an offset portion of the slot 84 comparable to offset portion 16 in slot 12. When the tow pin 80 is moved upwardly so that it may be diverted to a shunt slot, the enlarged diameter portion 86 is raised sufficently so that it is between the surfaces defining the slot 84. The diameter of portion 86 is slightly less than the distance across the slot 84. Hence, an offset portion in the slot 84 may cooperate with the tow pin to assist in directing the tow pin in a direction so that it may more easily enter the shunt slot. When the tow pin is to by-pass an offset portion in slot 84, the substantial space between the outer periphery of the tow pin 80 and the surfaces defining the slot 84 precludes undue wear on the tow pin 80.

When dog 36 is utilized with the system illustrated in FIGURES 7–9, the main slot need not have an offset portion. The lever arm 56 will impart sufficient force to the tow pin to cause the same to move transversely with respect to the dog 36 so that the tow pin will engage the cam surface 46. Cam surface 46 will impart sufficient force to the tow pin to cause the same to enter the shunt slot.

In FIGURE 12 there is illustrated an abutment 90 having a face 92 which may contact trip rod 32 and cause the same to rotate. Such rotation will cause movement of the tow pin about brackets 30 as explained above. Abutment 90 has a cam face 94 at an acute angle with respect to the main slot and disposed in a plane higher than the plane of face 92. When rod 32 reaches the extent of its rotation as determined by a limit stop, not shown, contact of rod 32 against face 94 imparts a side thrust to the tow truck which tends to cause the tow pin to move into the shunt slot.

Abutment 90 may be used with a system as illustrated in FIGURES 7–9 wherein the main slot does not have an offset portion. In this case, the abutment 90 will perform the function of arm 56 which can be dispensed with.

The present invention may be embodied in other specific forms without departing from the spirit or essential attributes thereof and, accordingly, reference should be made to the appended claims, rather than to the foregoing specification as indicating the scope of the invention.

I claim:

1. A tow truck system comprising a surface having a main slot, shunt slots in said surface intersecting said main slot at spaced points therealong, the intersection of said main and shunt slots being unobstructed, a tow truck having a tow pin extending into said main slot, conveyor means for propelling said tow pin along said main slot, said main slot being provided with a diverter means to cause said tow pin to enter one of said shunt slots when said tow pin has been moved out of contact with said conveyor means, said diverter means including an offset portion on said main slot in the area of the intersection of said main slot with said shunt slots.

2. A tow truck system comprising a surface having a main slot, shunt slots in said surface intersecting said main slot at spaced points therealong, the intersection of said main and shunt slots being unobstructed, a tow truck having a tow pin extending into said main slot, conveyor means for propelling said tow pin along said main slot, said main slot being provided with a diverter means to cause said tow pin to enter one of said shunt slots when said tow pin has been moved out of contact with said conveyor means, the lowermost end of said tow pin having an enlarged diameter portion whose diameter is substantially equal to the distance across said main slot, and said enlarged diameter portion being below the main slot for contact with said conveyor means.

3. A tow truck system comprising a surface having a main slot, shunt slots in said surface intersecting said main slot at spaced points therealong, the intersection of said main and shunt slots being unobstructed, a tow truck having a tow pin extending into said main slot, conveyor means for propelling said tow pin along said main slot, said main slot beng provided with a diverter means to cause said tow pin to enter one of said shunt slots when said tow pin has been moved out of contact with said conveyor means, said diverter means including a lever arm extending transversely across the main slot in a position so that it may impart a force to the tow pin in a direction calculated to assist in causing the tow pin to enter one of said shunt slots.

4. A tow truck system comprising a surface having a main slot, shunt slots in said surface intersecting said main slot at spaced points therealong, the intersection of said main and shunt slots being unobstructed, a tow truck having a tow pin extending into said main slot, conveyor means for propelling said tow pin along said main slot, said main slot being provided with a diverter means to cause said tow pin to enter one of said shunt slots when said tow pin has been moved out of contact with said conveyor means, said conveyor means including a dog having a pocket into which said tow pin extends when said tow pin is being propelled by said dog.

5. A tow truck system comprising a surface having a main slot, shunt slots in said surface intersecting said main slot at spaced points therealong, the intersection of said main and shunt slots being unobstructed, a tow truck having a tow pin extending into said main slot, conveyor means for propelling said tow pin along said main slot, said main slot being provided with a diverter means to cause said tow pin to enter one of said shunt slots when said tow pin has been moved out of contact with said conveyor means, said conveyor means including a dog having a pocket into which said tow pin extends when said tow pin is being propelled by said dog, said dog having a cam surface disposed in a plane above the plane of said pocket, whereby said cam surface may assist in causing the tow pin to enter one of said shunt slots when the lowermost end of the tow pin has been raised out of the pocket.

6. A tow truck system comprising a surface having a main slot, shunt slots in said surface intersecting said main slot at spaced points therealong, the intersection of said main and shunt slots being unobstructed, a tow truck having a tow pin extending into said main slot, conveyor means for propelling said tow pin along said main slot, said main slot being provided with a diverter means to cause said tow pin to enter one of said shunt slots when said tow pin has been moved out of contact with said conveyor means, said conveyor means including a dog having a portion adapted to contact the lowermost end of said tow pin, said portion of said dog being mounted for rotation thereby decreasing the amount of wear to which said portion is subjected by such contact.

7. A tow truck system comprising a surface having a main slot, shunt slots in said surface intersecting said main slot at spaced points therealong, the intersection of said main and shunt slots being unobstructed, a tow truck having a tow pin extending into said main slot, conveyor means for propelling said tow pin along said main slot, said main slot being provided with a diverter means to cause said tow pin to enter one of said shunt slots when said tow pin has been moved out of contact with said conveyor means, said diverter means including an offset portion on said main slot in the area of the intersection of said main slot with said shunt slots, the lowermost portion of said tow pin below said main slot being provided with an increased diameter portion, the diameter of said last mentioned portion being slightly less than the distance across said main slot, and the diameter of said tow pin extending through said main slot being substantially less than the distance across said main slot.

8. A conveyor system for use with a tow truck having a tow pin thereon by which the truck may be propelled comprising a surface having a main slot and a plurality of shunt slots intersecting the main slot at unobstructed juncture points spaced along the main slot, conveyor means for propelling a tow pin along said main slot, said main slot being provided with a diverter means to cause said tow pin to enter a predetermined one of said shunt slots, selector means for determining the particular shunt slot for said tow pin, and said conveyor means including a restraining means to prevent a tow pin from entering all but the one shunt slot.

9. A system in accordance with claim 8 wherein said diverter means includes an offset portion in said main slot at the juncture of said main slot and said shunt slots.

10. A system in accordance with claim 8 wherein said conveyor means includes a dog, said restraining means including a pocket in said dog into which the lowermost end of a tow pin may extend when a tow pin is being propelled by said dog.

11. A system in accordance with claim 8 wherein said conveyor means includes a dog, and said dog having a camming surface for imparting a force to a tow pin in a direction forming an acute angle with the longitudinal axis of said main slot.

12. A system in accordance with claim 8 wherein said conveyor means includes a dog, said dog having a rotatably mounted member thereon which is adapted to provide rolling contact between the member and a tow pin extending through the main slot.

13. A conveyor system for use with a truck having a tow pin thereon by which the truck may be propelled comprising a surface having a main slot and a plurality of shunt slots intersecting the main slot at unobstructed juncture points spaced along the main slot, conveyor means for propelling the tow pin along said main slot, said main slot being provided with a diverter means to cause said tow pin to enter a predetermined one of said shunt slots, selector means for determining the shunt slot for said tow pin, said conveyor means including a restraining means to prevent a tow pin from entering all but the one shunt slot, a fixed bridge extending across the shunt slots at the juncture of the shunt slots and the main slot, each bridge being disposed in a plane so that it prevents entry of a tow pin into a shunt slot when the tow pin is engaged with said conveyor means.

14. A system in accordance with claim 13 wherein said diverter means includes a plurality of biased lever arms extending transversely across the main slot, each lever arm being associated with one of said bridges.

15. A system in accordance with claim 8 wherein said diverter means includes an offset portion at the juncture of each shunt slot and main slot, said offset portion being parallel to the main slot and connected at its ends to the main slot by an angled portion forming an acute angle with the longitudinal axis of the main slot.

16. A conveyor system for use with a tow truck having a tow pin thereon by which the truck may be propelled comprising a surface having a main slot and a plurality of shunt slots intersecting the main slot at unobstructed juncture points spaced along the main slot, conveyor means for propelling a tow pin along said main slot, said main slot being provided with a diverter means to cause said tow pin to enter a predetermined one of said shunt slots, selector means for determining the shunt slot for said tow pin, said conveyor means including a restraining means to prevent a tow pin from entering all but the one shunt slot, said diverter means including an offset portion at the juncture of each shunt slot and main slot, said offset portion being parallel to the main slot and connected at its ends to the main slot by angled portions forming acute angles with the longitudinal axis of the main slot, the offset portion being spaced from the main slot by a distance corresponding to approximately one-half the width of the main slot.

17. A conveyor system for use with a tow truck having a tow pin thereon by which the truck may be propelled comprising a surface having a main slot and a plurality of shunt slots intersecting the main slot at unobstructed juncture points spaced along the main slot, conveyor means for propelling a tow pin along said main slot, said main slot being provided with a diverter means, selector means for causing said tow pin to enter a predetermined one of said shunt slots, said diverter means including offset portions adjacent the junctures of the shunt slots with the main slot, said conveyor means being below the main slot, and only said main slot having offset portions so that the conveyor means extends across the ends of the offset portions in the general direction of the main slot.

18. A conveyor system for use with a tow truck having a tow pin thereon by which the truck may be propelled comprising a surface having a main slot and a plurality of shunt slots intersecting the main slot at unobstructed juncture points spaced along the main slot, conveyor means for propelling a tow pin along said main slot, means for causing the tow pin to enter a predetermined shunt slot, said means including a cam surface on a portion of said conveyor means.

19. A conveyor system comprising a surface having a main slot and a plurality of shunt slots intersecting the main slot at unobstructed juncture points spaced along the main slot, a truck having a tow pin thereon by which the truck may be propelled along said main slot, conveyor means for cooperation with said tow pin for propelling said truck along said main slot, said truck having a trip rod, an abutment on said surface adjacent at least one of said juncture points, said abutment being mounted on that side of the main slot opposite the juncture of said main slot and one of said shunt slots, a face on said abutment for contacting and rotating said trip rod through a limited angle about an axis substantially perpendicular to the longitudinal axis of the rod, and a cam face on said abutment, said cam face forming an acute angle with respect to said main slot and being adapted to impart a thrust on the trip rod in a direction causing the tow pin to enter the last-mentioned shunt slot.

References Cited in the file of this patent

UNITED STATES PATENTS

| | | |
|---|---|---|
| 1,443,382 | Rapier | Jan. 30, 1923 |
| 1,917,837 | Haddlesay | July 11, 1933 |
| 2,619,370 | Leger | Nov. 25, 1952 |
| 2,936,718 | Bradt et al. | May 17, 1960 |
| 3,021,796 | Parshall et al. | Feb. 20, 1962 |
| 3,044,417 | Burrows | July 17, 1962 |
| 3,045,610 | Klamp | July 24, 1962 |
| 3,048,126 | Salapatas | Aug. 7, 1962 |

FOREIGN PATENTS

| | | |
|---|---|---|
| 422,696 | France | Jan. 26, 1911 |